United States Patent
Billotte Cabre et al.

(10) Patent No.: US 10,239,795 B2
(45) Date of Patent: Mar. 26, 2019

(54) METHOD OF FABRICATING A FIBER PREFORM FILLED WITH REFRACTORY CERAMIC PARTICLES

(71) Applicants: SAFRAN AIRCRAFT ENGINES, Paris (FR); SAFRAN, Paris (FR)

(72) Inventors: Catherine Billotte Cabre, La Prairie (CA); Nicolas Droz, Moissy-Cramayel (FR); Ludovic Liais, Moissy-Cramayel (FR); Michael Podgorski, Paris (FR); Edu Ruiz, Montreal (CA); Sylvain Turenne, Saint-Bruno (CA)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 15/538,982

(22) PCT Filed: Dec. 18, 2015

(86) PCT No.: PCT/FR2015/053621
§ 371 (c)(1),
(2) Date: Jun. 22, 2017

(87) PCT Pub. No.: WO2016/102839
PCT Pub. Date: Jun. 30, 2016

(65) Prior Publication Data
US 2017/0369382 A1 Dec. 28, 2017

(30) Foreign Application Priority Data

Dec. 23, 2014 (FR) ..................................... 14 63286

(51) Int. Cl.
*C04B 35/80* (2006.01)
*C04B 35/64* (2006.01)
(Continued)

(52) U.S. Cl.
CPC ............ *C04B 35/803* (2013.01); *B28B 1/265* (2013.01); *B28B 1/52* (2013.01); *B28B 7/368* (2013.01);
(Continued)

(58) Field of Classification Search
CPC . C04B 35/80–35/806; C04B 2235/616; B29C 70/48
See application file for complete search history.

(56) References Cited

U.S. PATENT DOCUMENTS 5,316,462 A * 5/1994 Seemann ................ B29C 33/10
264/316
5,436,042 A 7/1995 Lau et al.
(Continued)

FOREIGN PATENT DOCUMENTS

EP   2 181 974 A1   5/2010
FR   2 326 275 A1   4/1977
(Continued)

OTHER PUBLICATIONS

International Preliminary Report on Patentability and the Written Opinion of the International Searching Authority as issued in International Patent Application No. PCT/FR2015/053621, dated Jun. 27, 2017.
(Continued)

*Primary Examiner* — Erin Snelting
(74) *Attorney, Agent, or Firm* — Pillsbury Winthrop Shaw Pittman LLP

(57) ABSTRACT

A method of fabricating a fiber preform filled with refractory ceramic particles, includes placing a fiber texture including refractory ceramic fibers in a mold cavity; injecting a slip including a powder of refractory ceramic particles present in a liquid medium, the slip being injected into the pores of the fiber texture present in the mold cavity, injection being
(Continued)

performed through at least a first face or a first edge of the fiber texture; and draining the liquid medium of the slip that has penetrated into the fiber texture through the porous material part, the draining being performed at least through a second face or a second edge of the fiber texture different from the first face or the first edge, the porous material part also serving to retain the refractory particle powder in the pores of the fiber texture to obtain a fiber preform filled with refractory particles.

16 Claims, 2 Drawing Sheets

(51) Int. Cl.

| | | |
|---|---|---|
| *B28B 1/26* | (2006.01) | |
| *B28B 7/36* | (2006.01) | |
| *C04B 35/117* | (2006.01) | |
| *C04B 35/14* | (2006.01) | |
| *C04B 35/18* | (2006.01) | |
| *C04B 35/185* | (2006.01) | |
| *C04B 35/447* | (2006.01) | |
| *C04B 35/565* | (2006.01) | |
| *C04B 35/58* | (2006.01) | |
| *C04B 35/626* | (2006.01) | |
| *C04B 35/634* | (2006.01) | |
| *B28B 23/02* | (2006.01) | |
| *B29C 70/48* | (2006.01) | |
| *D03D 25/00* | (2006.01) | |
| *B28B 1/52* | (2006.01) | |
| *B28B 11/24* | (2006.01) | |
| *C04B 35/628* | (2006.01) | |
| *F01D 5/28* | (2006.01) | |
| *B29K 309/02* | (2006.01) | |
| *B29K 509/02* | (2006.01) | |

(52) U.S. Cl.
CPC ............ *B28B 11/243* (2013.01); *B28B 23/02* (2013.01); *B29C 70/48* (2013.01); *C04B 35/117* (2013.01); *C04B 35/14* (2013.01); *C04B 35/18* (2013.01); *C04B 35/185* (2013.01); *C04B 35/447* (2013.01); *C04B 35/565* (2013.01); *C04B 35/58071* (2013.01); *C04B 35/62625* (2013.01); *C04B 35/62847* (2013.01); *C04B 35/62886* (2013.01); *C04B 35/62892* (2013.01); *C04B 35/634* (2013.01); *C04B 35/64* (2013.01); *C04B 35/806* (2013.01); *D03D 25/005* (2013.01); *B29K 2309/02* (2013.01); *B29K 2509/02* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5256* (2013.01); *C04B 2235/5436* (2013.01); *C04B 2235/5445* (2013.01); *C04B 2235/5463* (2013.01); *C04B 2235/604* (2013.01); *C04B 2235/6022* (2013.01); *C04B 2235/6027* (2013.01); *C04B 2235/616* (2013.01); *D10B 2101/20* (2013.01); *F01D 5/282* (2013.01); *F01D 5/284* (2013.01); *F05D 2300/601* (2013.01); *F05D 2300/6033* (2013.01); *F05D 2300/6034* (2013.01)

(56) References Cited

U.S. PATENT DOCUMENTS

| | | | |
|---|---|---|---|
| 2012/0217670 A1 | 8/2012 | Ruiz et al. | |
| 2013/0116109 A1* | 5/2013 | Ritti | ............ C04B 35/117 |
| | | | 501/95.2 |
| 2016/0107400 A1* | 4/2016 | Feeney | ............ B29C 70/443 |
| | | | 264/511 |

FOREIGN PATENT DOCUMENTS

| | | | |
|---|---|---|---|
| FR | 2 702 475 | A1 | 9/1994 |
| FR | 2 958 933 | A1 | 10/2011 |

OTHER PUBLICATIONS

International Search Report as issued in International Patent Application No. PCT/FR2015/053621, dated Mar. 21, 2016.

Sas, H. S., et al., "Modeling of particle-resin suspension impregnation in compression resin transfer molding of particle-filled, continuous fiber reinforced composites," Heat Mass Transfer, vol. 50, No. 3, Dec. 2013, ISSN: 0947-7411, pp. 397-414.

Chang, C.-H., "Modeling and evaluation of the filling process of vacuum-assisted compression resin transfer molding," Journal of Polymer Engineering, Walter De Gruyter GMBH, vol. 33, No. 3, May 2013, ISSN: 0334-6447, pp. 211-219.

* cited by examiner

METHOD OF FABRICATING A FIBER PREFORM FILLED WITH REFRACTORY CERAMIC PARTICLES

CROSS REFERENCE TO RELATED APPLICATIONS

This application is the U.S. National Stage of PCT/FR2015/053621 filed Dec. 18, 2015, which in turn claims priority to French Application No. 1463286, filed Dec. 23, 2014. The contents of both applications are incorporated herein by reference in their entirety.

BACKGROUND OF THE INVENTION

The invention relates to methods of fabricating parts out of composite material comprising a fiber preform and a refractory ceramic matrix.

The present invention relates to a method of fabricating a part out of thermostructural ceramic matrix composite (CMC) material, i.e. material comprising fiber reinforcement formed from fibers made of refractory ceramic material with the pores being filled in with a matrix, likewise made of refractory ceramic material, and the invention relates in particular to a method of fabricating a part of the oxide/oxide type.

Parts made out of oxide/oxide composite material are generally prepared by draping a plurality of fiber plies in a mold, the plies being made from refractory oxide fibers, each ply previously being impregnated with a slip filled with refractory oxide particles. The set of plies as arranged in this way is then compacted using a countermold or a vacuum sheet. When a vacuum sheet is used, the preimpregnated plies may for example be passed to an autoclave (a method of the preimpregnated organic matrix composite (OMC) type). The filled preform as obtained in this way is then subjected to sintering in order to form a refractory oxide matrix in the preform and obtain a part made of oxide/oxide composite material. That technique can also be used to make other parts out of ceramic matrix composite (CMC) material. Under such circumstances, the fiber plies may be made from fibers of silicon carbide (SiC), or of carbon (C), and they may be impregnated with a slip filled with particles of carbide (e.g. of SiC), of boride (e.g. of $TiB_2$), of nitride (e.g. of $Si_3N_4$), or of oxide, e.g. alumina or zirconia.

Nevertheless, that type of method of preparation can be used only to make ceramic matrix composite material parts that are of small thickness and with fiber reinforcement that is two-dimensional (2D). The mechanical characteristics of such composite materials are very different depending on the inherent directions of the reinforcing structure. More precisely, those materials present little resistance to delamination and to forces not in their plane.

Fiber textures obtained by three-dimensional weaving between continuous warp and weft yarns enables the mechanical strength of the material to be increased, and in particular enables its ability to withstand delamination to be increased. Under such circumstances, and also for thick 2D fiber textures, it is possible to cause a filled suspension to penetrate into the fiber texture, which may be of thickness that reaches several tens of millimeters, depending on the intended applications, only by means of methods that make use of a pressure gradient, such as infusion type methods, injection molding type methods known as resin transfer molding (RTM), or methods involving suction of submicron powder known as advanced powder solutions (APS).

Nevertheless, in the context of making a part out of ceramic matrix material, those methods present certain drawbacks.

Specifically, a fiber texture of complex shape and of considerable thickness cannot be impregnated by an infusion type method, since that type of method does not enable a sufficient pressure gradient to be achieved for obtaining good impregnation of the entire texture. The APS type method does not enable the volume fraction of the matrix inserted into the preform to be finely controlled, nor does it make it possible to control surface states finely.

Although the RTM method can be used for impregnating a fiber texture with a filled slip, it nevertheless requires a step to be performed of eliminating (discharging and/or evaporating) the liquid medium of the slip so as to leave only the solid fillers in the preform prior to sintering. That additional step lengthens the time required to perform the method.

Furthermore, the step of eliminating the liquid medium can lead to a loss of particles and/or to a change in the way the particles are distributed within the preform, and thus to the appearance of macropores in the final material as a result of the matrix missing in certain locations.

Account should also be taken of the fact that in RTM methods using a step of injecting the slip, it can be necessary to limit the volume fraction of refractory ceramic particles present in the slip in order to conserve viscosity that is low enough to enable the slip to be injected uniformly. This constraint can make it necessary to repeat the slip injection step, and consequently the step of eliminating the liquid medium, so as to end up with the desired volume fraction for the matrix. The limit on the volume content of refractory ceramic particles in the slip can thus complicate the fabrication method.

Consequently, there exists a need to simplify methods of fabricating preforms filled with refractory particles for the purpose of forming composite material parts presenting a desired matrix volume fraction.

There also exists a need to have methods that are fast and reliable for fabricating composite material parts that present the desired properties from a fiber texture that is thick and/or of complex shape.

OBJECT AND SUMMARY OF THE INVENTION

To this end, in a first aspect, the invention provides a method of fabricating a fiber preform filled with refractory ceramic particles, the method comprising the following steps:

a) placing a fiber texture comprising refractory ceramic fibers in a mold cavity defined by a mold and a countermold;

b) injecting a slip comprising a powder of refractory ceramic particles present in a liquid medium, the slip being injected into the pores of the fiber texture present in the mold cavity, injection being performed through at least a first face or a first edge of said fiber texture; and c) draining the liquid medium of the slip that has penetrated into the fiber texture through the porous material part having thickness greater than or equal to 0.1 millimeters (mm), the draining being performed at least through a second face or a second edge of the fiber texture different from the first face or the first edge, said porous material part also serving to retain the refractory particle powder in the pores of the fiber texture in order to obtain a fiber preform filled with refractory particles.

An edge designates a side of the fiber texture that extends along its thickness (i.e. along the shortest direction of the fiber texture), the sides of the fiber texture that are not edges are referred to as "faces". For example, when the fiber texture is in the form of a plate, it presents two opposite faces ("front" and "back") and one or more edges. When the fiber texture is to constitute the fiber reinforcement of a blade, the edges of the fiber texture are to constitute the leading edge and the trailing edge of the blade, while the faces of the fiber texture are to constitute the pressure-side and the suction-side faces of the blade.

The thickness of the porous material part corresponds to its smallest dimension.

By using a porous material part enabling the liquid medium of the slip to be drained selectively, the method of the invention makes it possible to eliminate the liquid medium of the slip introduced into the fiber texture, while retaining the refractory ceramic solid particles in the fiber texture. By using the porous material part that enables the liquid medium to be eliminated selectively, the invention advantageously makes it possible to obtain an accumulation of refractory particles in the fiber texture. The invention thus makes it possible to make successful use of methods in which the slip is injected into the pores of a fiber texture, which methods require slips to be used having relatively little filler, while nevertheless making it possible to obtain a high filling fraction of refractory ceramic particles in the texture and consequently a high matrix volume fraction after the particles have been sintered. The method of the invention thus makes it possible, in simple manner, to obtain thermostructural composite material parts that present improved mechanical properties.

During step b), the slip is injected into the mold cavity through one or more injection ports. During step c), the liquid medium is drained through at least one outlet vent. The draining in step c) is performed by applying a pressure difference between the injection port and the outlet vent. This pressure difference may be applied in various ways, and for example by injecting the slip under pressure during step b) and/or by pumping at the outlet vent and/or by applying a compacting pressure on the fiber texture using the mold and the countermold.

In an implementation, a pressure less than or equal to 950 millibars (mbar), e.g. lying in the range 50 mbar to 950 mbar, may be applied to the outlet vent during step c).

In an implementation, during step b), the slip may be injected under pressure, e.g. at an injection pressure that is greater than or equal to 1.1 bar, e.g. lying in the range 1.1 bar to 6 bar.

Advantageously, it is possible to perform a single slip injection stage. In a variant, it is possible to perform a first slip injection stage, then to interrupt injecting the slip, and then to perform a second slip injection stage.

In an implementation, the mold may constitute a rigid support on which the fiber texture is present and the countermold may be rigid.

In other words, under such circumstances, the mold and the countermold do not deform while the method of the invention is being performed. Advantageously, such an implementation makes it possible to fabricate a composite material part of a shape that is accurate and imposed by the shape of the mold and the countermold. Controlling the shape of the part that is to be fabricated in this way is advantageous, in particular when the part is to be used in the field of aviation.

In an implementation, the mold may constitute a rigid support on which the fiber texture is present, and the countermold may be deformable.

In an implementation, the porous material part may be present between the mold and the fiber texture, or between the countermold and the fiber texture.

In an implementation, the porous material part may constitute part or all of the mold or of the countermold.

In an implementation, the countermold may exert pressure on the fiber texture during and/or after step b).

Applying such a pressure to the fiber texture advantageously serves to accelerate impregnation of the fiber texture by means of the slip and to accelerate drainage of the liquid medium.

In an implementation, during and/or after step b), the fiber texture may be compacted between the mold and the countermold. In other words, under such circumstances, the fiber texture is in a compacted shape between the mold and the countermold during and/or after step b) as a result of a compacting pressure being applied by the countermold.

In addition to the above-described advantage concerning the application of pressure on the fiber texture, compacting the fiber texture advantageously makes it possible to achieve a target thickness for the fiber texture and consequently to achieve a target thickness for the composite material part that is to be obtained.

In an implementation, the compacting pressure may be applied before step b) and may subsequently be maintained during step b). In a variant, step b) may be initiated first and then the compacting pressure may be applied after the beginning of step b) and may thereafter be maintained.

The pressure exerted by the countermold on the fiber texture may be obtained by applying a fluid (a gas or a liquid) against the countermold, the fluid being introduced into a chamber, with the countermold being situated between the chamber and the mold cavity.

During step c), pumping may be performed at the outlet vent in order to suck out some or all of the liquid medium present in the pores of the fiber texture. As an alternative, or in combination, it is possible during step c) to heat the liquid medium present in the pores of the fiber texture in order to cause it to evaporate through the second face or the second edge of the fiber texture and through the porous material part.

In an implementation, during step b), the slip may be injected through a plurality of different zones of the outside surface of the fiber texture.

In an implementation, during step b), the slip may be injected through a plurality of injection ports opening out into different zones of the mold cavity.

In a variant, or in combination, a distributor element may be present in the mold cavity to distribute the flow of slip, said distributor element defining a plurality of openings through which the slip flows during step b) in order to reach the first face or the first edge of the fiber texture.

Such an implementation makes it possible to perform multipoint injection into the fiber texture and consequently to obtain a uniform distribution of the refractory ceramic particles in the fiber texture more quickly and in more uniform manner.

In an implementation, the slip may be injected through a first side of the fiber texture and the liquid medium may be drained through a second side of the fiber texture, opposite from the first side.

In an implementation, during step b), the slip may be injected at least through an edge of the fiber texture, and, during step c), draining may be performed at least through a face of the fiber texture.

In an implementation, during step b), the slip may be injected at least through a first face of the fiber texture, and, during step c), draining may be performed at least through a second face of the fiber texture, different from the first face.

In an implementation, prior to step b), the slip may present a volume content of refractory ceramic particles that is less than or equal to 40%.

Using a slip presenting such a volume fraction of refractory ceramic particles advantageously makes it possible to improve the injection capacity of the slip by limiting its viscosity.

Thus, the viscosity of the slip prior to step b) may advantageously be less than or equal to 150 millipascals per second (mPa·s$^{-1}$), or even less than or equal to 60 mPa·s$^{-1}$. The viscosity of the slip is measured using a Brookfield type viscosity meter at a temperature of 20° C.

In an implementation, the slip may include an organic binder.

Using an organic binder in the slip is advantageous, since that makes it possible to improve the ability of the green preform (i.e. the preform after injection and drying and before sintering of the refractory ceramic particles) to hold together, which is advantageous, in particular when the fiber texture is of complex shape. Using an organic binder is also advantageous in order to maintain the fiber volume fraction by improving control over thickness after injecting the slip.

Furthermore, the slip that is used need not have any pre-ceramic polymer such as precursors for polysilane-based ceramic material. In a variant, the slip may include a pre-ceramic polymer. In an implementation, the refractory particles may constitute the only solid phase present in the slip that is used.

In an implementation, the fiber texture may have a plurality of refractory oxide fibers and the refractory particles may be refractory oxide particles.

The present invention also provides a method of fabricating a composite material part and including the following steps:

d) sintering the refractory ceramic particles present in the fiber preform obtained by performing a method as described above so as to form a refractory matrix in the pores of said preform.

By way of example, the part that is obtained after sintering may constitute a turbine engine blade.

Before the sintering step, it is possible to unmold the filled preform that is obtained at the end of step c) and to place it in an oven in which sintering is to be performed.

BRIEF DESCRIPTION OF THE DRAWINGS

Other characteristics and advantages of the invention appear from the following description of particular implementations of the invention, given as non-limiting examples and with reference to the accompanying drawings, in which.

DETAILED DESCRIPTION OF IMPLEMENTATIONS

Figure 1:
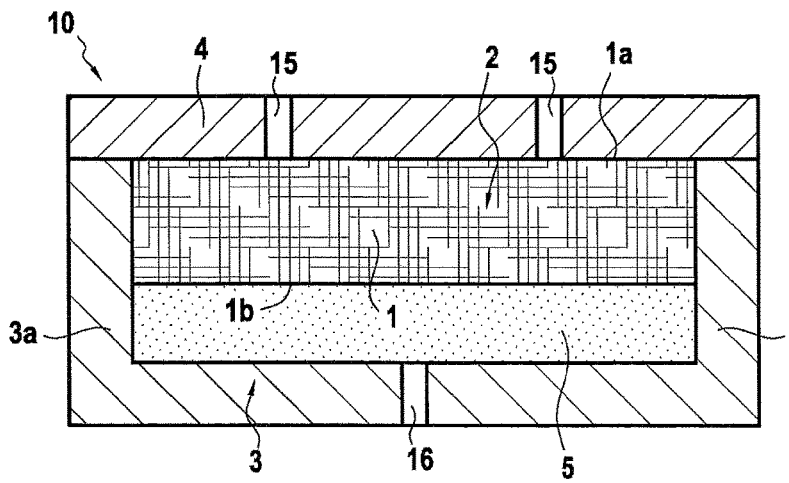
FIGS. 1 and 2 are diagrammatic and fragmentary views of the configuration obtained after performing various steps in a first implementation of the method of the invention.

FIG. 1 shows the configuration obtained after performing step a) in a first implementation of the method of the invention. As shown in FIG. 1, a fiber texture 1 comprising refractory ceramic fibers is present in a mold cavity 2. The fiber structure 1 may be made in known manner by using a Jacquard or shuttle type loom to weave a bundle of warp yarns or strands occupying a plurality of layers, with the warp yarns being interlinked by weft yarns, or vice versa. The fiber texture may be made by stacking plies obtained by two-dimensional (2D) weaving. The fiber texture may also be made directly as a single part by three-dimensional (3D) weaving. The term "two-dimensional weaving" is used herein to mean a conventional method of weaving in which each weft yarn passes from one side to the other of yarns in a single layer of warp yarns, or vice versa.

The method of the invention may be particularly suited to enabling a filled slip to be introduced into 2D fiber textures, namely textures obtained by stacking 2D plies, and of considerable thickness, e.g. 2D fiber structures having a thickness of at least 0.5 mm, and preferably at least 1 mm.

The term "three-dimensional weaving" or "3D weaving", or indeed "multilayer weaving" is used herein to mean weaving in which at least some of the weft yarns interlink warp yarns in a plurality of layers of warp yarns, or vice versa, by weaving with a weave that may in particular be selected from the following weaves: interlock, multi-plain, multi-satin, and multi-twill.

The term "interlock weave or fabric" is used herein to mean 3D weaving in which each layer of warp yarns interlinks a plurality of layers of weft yarns with all of the yarns in the same warp column having the same movement in the weave plane.

The term "multi-plain weave or fabric" is used herein to mean 3D weaving with a plurality of layers of weft yarns in which the base weave for each layer is equivalent to a weave of conventional plain type, but with certain points of the weave interlinking the layers of weft yarns together.

The term "multi-satin weave or fabric" is used herein to mean 3D weaving with a plurality of layers of weft yarns in which the base weave for each layer is equivalent to a weave of conventional satin type, but with certain points of the weave interlinking layers of weft yarns together.

The term "multi-twill weave or fabric" is used herein to mean 3D weaving with a plurality of layers of weft yarns in which the base weave for each layer is equivalent to a conventional twill type weave, but with certain points of the weave interlinking layers of weft yarns together.

3D textures present complex shape into which it can be difficult to introduce solid particles in suspension and to spread them out uniformly. The method of the invention is also very well adapted to introducing a filled slip into 3D woven fiber textures.

The fiber texture performing the fiber reinforcement of the composite material part may include fibers selected from: alumina fibers; mullite fibers; silica fibers; aluminosilicate fibers; borosilicate fibers; silicon carbide fibers; carbon fibers; and mixtures of such fibers.

The fiber texture used may for example be made by 2D weaving or by 3D weaving (stacking 2D plies or 3D weaving). The fiber texture may also be made by stacking a plurality of fiber structures obtained by 3D weaving. By way of example, the fiber texture used may comprise a plurality of Nextel 610™ alumina yarns.

The molding cavity 2 is defined by a mold 3 and a countermold 4. In the example shown, the mold 3 and the countermold 4 are rigid. The mold 3 constitutes a rigid support on which the fiber texture 1 is present during the injection and draining steps b) and c). The mold 3 has side walls 3a and 3b defining the mold cavity 2. In the example shown, the device 10 in which the fiber texture 1 is present is closed in its bottom portion by the mold 3 and is closed in its top portion by the countermold 4 that forms a lid closing the device 10. The mold 3 and the countermold 4 serve to dimension the preform and thus the part that is to be obtained, and also to adjust the volume fraction of fibers in the part to be obtained.

The countermold 4 has a plurality of slip injection ports 15 through which the slip is to be injected in order to penetrate into the pores of the fiber texture 1 through the first face 1a of the fiber texture 1. In the example shown in FIG. 1, the slip is for injecting through a plurality of injection ports 15 opening out into different zones of the molding cavity. Nevertheless, it would not go beyond the ambit of the invention if the slip were to be injected through a single injection port.

The mold 3 has a single outlet vent 16 for the liquid medium of the slip. Naturally, it would not go beyond the ambit of the invention for a plurality of outlet vents to be used.

In the example shown, the porous material part 5 is present in the mold cavity 2 between the mold 3 and the fiber texture 1. The porous material part 5 is present between the outlet vent 16 and the fiber texture 1. In the example shown, the porous material part 5 is present in contact with the mold 3 and in contact with the second face 1b of the fiber texture 1 through which the liquid medium of the slip is to be drained. In the example shown in FIG. 1, the second face 1b of the fiber texture 1 is situated on the side opposite from the first face 1a through which the slip is to penetrate into the texture 1.

The porous material part 5 may for example be made out of microporous polytetrafluoroethylene (PTFE) such as the "microporous PTFE" products sold by the supplier Porex®. By way of example, the porous material part 5 may be made out of the material PM 0130 sold by the supplier Porex® and presenting a pore size lying in the range 1 μm to 2 μm.

In the example shown, the porous material part 5 extends over the entire second face 1b and covers the outlet vent 16 completely. It would not go beyond the ambit of the present invention for the porous material part 5 to extend over a portion only of the second face 1b and to cover the outlet vent 16 completely. In a variant that is not shown, the porous material part could extend along the entire second face and could extend beyond it.

The porous material part 5 enables the liquid medium of the slip to be drained out from the fiber texture 1 and discharged through the outlet vent 16 by applying a pressure gradient between the outlet vent 16 and the injection ports 15.

The porous material part 5 presents thickness that is greater than or equal to 0.1 mm. By way of example, the porous material part 5 may present thickness that is greater than or equal to 1 mm, or indeed several millimeters. The mean porosity of the porous material part 5 may be about 30%. The mean pore size (D50) of the porous material part 5 may for example lie in the range 1 μm to 2 μm.

In an implementation, the porous material part 5 may be rigid and present a shape that matches the shape of the preform and of the composite material part that is to be obtained. Under such circumstances, the porous material part may for example be made by thermoforming. In a variant, the porous material part may be deformable and may take the shape of the mold, which shape corresponds to the shape of the preform and of the composite material part that is to be obtained.

Prior to performing step b), a compacting pressure may be applied serving to compact the fiber texture 1 between the mold 3 and the countermold 4, which compacting pressure may be maintained during step b). In a variant, the compacting pressure may be applied after beginning to inject the slip (i.e. after the beginning of step b)), and may subsequently be maintained. In particular, the compacting pressure may be applied once injection of the slip has terminated and may subsequently be maintained. For example, the fiber texture may be subjected during and/or after step b) to a compacting pressure that is less than or equal to 15 bar, e.g. less than or equal to 7 bar. During and/or after step b), the fiber texture may be subjected to a compacting pressure greater than or equal to 0.3 bar. The application of a compacting pressure may serve to compact the texture in order to assist draining the liquid medium and reach a target thickness for the fiber preform without damaging it.

As mentioned above, the compacting pressure may be applied by a fluid that is applied against the countermold 4 on its side opposite from the molding cavity 2.

Figure 2:
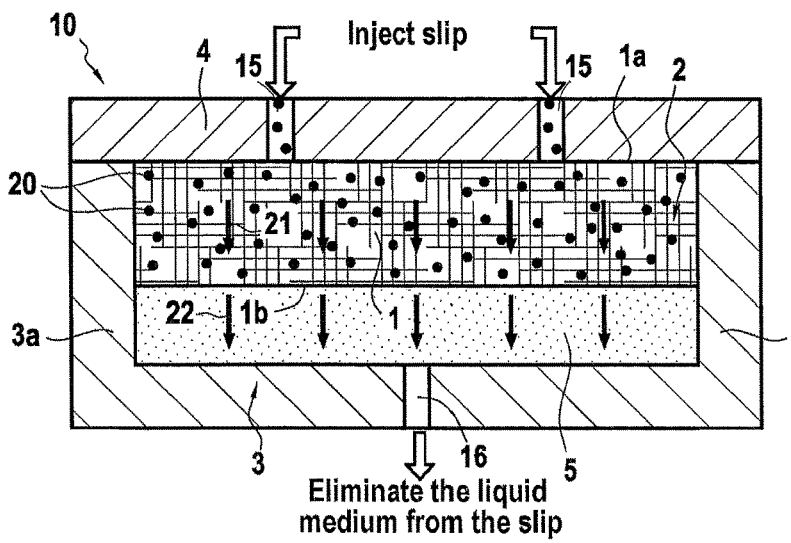

FIG. 2 shows a configuration obtained while injecting the slip and draining the liquid medium. The slip has been injected via the injection port 15 so as to penetrate into the fiber texture 1 through the first face 1a of the fiber texture 1. The refractory particles 20 present in the slip are for forming a refractory ceramic matrix in the pores of the fiber texture 1. In an implementation, this refractory ceramic matrix may be a refractory oxide matrix.

By way of example, the slip may be a suspension of an alumina powder in water. The mean particle size (D50) of the alumina powder may lie in the range 0.1 μm to 0.3 μm. The alumina powder used may be an alpha alumina powder sold by the supplier Baikowski under the name SM8.

More generally, the slip may be a suspension including refractory ceramic particles presenting a mean particle size in the range 0.1 μm to 10 μm. The volume fraction of refractory particles in the slip prior to step b) may lie in the range 25% to 40%. The refractory ceramic particles may comprise a material selected from: alumina; mullite; silica; aluminosilicates; aluminophosphates; carbides; borides; nitrides; and mixtures of such materials. As a function of their base composition, the refractory ceramic particles may also be mixed with particles of alumina, of zirconia, of aluminosilicate, of a rare earth oxide, of a rare earth silicate (which may for example be used for environmental or thermal barriers), or any other filler serving to provide a function for the composite material part that is to be obtained, such as carbon black, graphite, or silicon carbide.

By way of example, the liquid medium of the slip may include an aqueous phase presenting an acid pH (i.e. a pH less than 7) and/or an alcohol phase, e.g. including ethanol. The slip may include an acidifier, such as nitric acid, and the pH of the liquid medium may lie in the range 1.5 to 4, for example. Furthermore, the slip may include an organic binder such as polyvinyl alcohol (PVA) which is soluble in water, in particular.

As shown in FIG. 2, after the slip has been injected, the refractory ceramic particles 20 are present in the pores of the fiber texture 1. Arrows 21 show the movement of the slip injected into the fiber texture 1. Arrows 22 show the movement of the liquid medium of the slip being drained via the porous material part 5.

The countermold 4 exerts pressure on the fiber texture 1 during and/or after step b) in order to accelerate the draining of the liquid medium.

It is also possible to perform pumping via the outlet vent 16 during step c), e.g. by means of a primary vacuum pump. Performing such pumping serves to improve the draining and to dry the fiber texture more quickly.

As an alternative, or in combination, during step c), it is possible to heat the liquid medium still present in the pores of the fiber texture in order to evaporate the medium through the second face of the fiber texture and the porous material part. For example, the temperature of the liquid medium may be raised to a temperature in the range 80° C. to 105° C.

In this configuration, the porous material part 5 serves to retain the refractory ceramic particles 20 that were initially present in the slip within the fiber texture 1 so that some or all of these particles 20 become deposited by filtering in the fiber texture 1.

Once the injection and draining step have been performed, a fiber preform is obtained that is filled with refractory ceramic particles, e.g. particles of refractory ceramic oxide, e.g. of alumina.

The resulting preform is subsequently dried and then unmolded, the preform being capable of retaining the shape it adopted in the molding cavity after unmolding, e.g. the shape adopted after being compacted between the mold and the countermold.

The preform is then subjected to sintering heat treatment, e.g. in air at a temperature in the range 1000° C. to 1200° C., in order to sinter the refractory ceramic particles and thus form a refractory ceramic matrix in the pores of the fiber preform. A composite material part is thus obtained, e.g. a part made out of oxide/oxide composite material, which part comprises fiber reinforcement formed by the fiber preform and presents a matrix volume fraction that is high, with the refractory ceramic matrix being uniformly distributed throughout the fiber reinforcement.

A part made of CMC composite material other than an oxide/oxide material may be obtained in the same manner by making the fiber texture out of silicon carbide fibers and/or carbon fibers and by using a slip filled with particles of carbide (e.g. of SiC), of boride (e.g. of $TiB_2$), or of nitride (e.g. of $Si_3N_4$).

Figure 3:
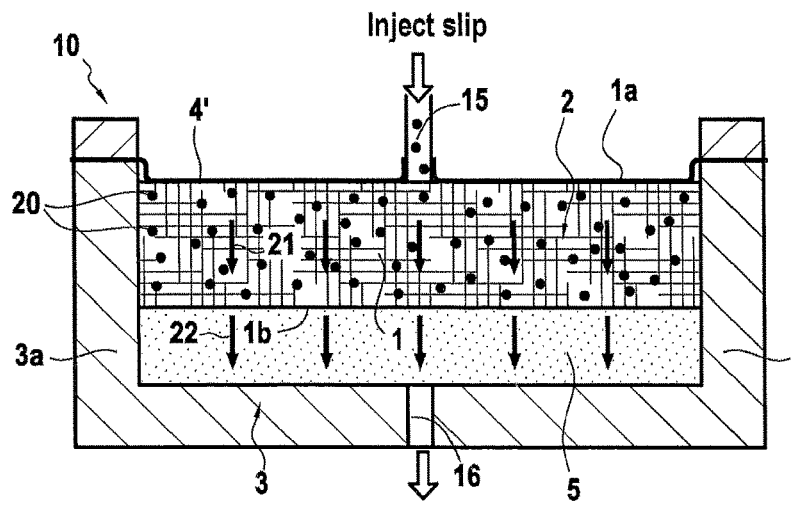
FIG. 3 is a diagrammatic and fragmentary view showing the configuration obtained while injecting and draining in a variant of the method of the invention in which a "poly-flex" type method is performed.

FIG. 3 shows a variant embodiment in which the countermold 4' is deformable. A pressure is exerted on the deformable countermold 4' in order to keep the deformable countermold 4' against the first face 1a of the fiber texture 1. As described above, the countermold 4' may exert pressure on the fiber texture 1 during the method. As described above, FIG. 3 also shows the presence of refractory particles 20 in the pores of the fiber texture 1 and the liquid medium of the injected slip being drained (arrows 22).

Figure 4:
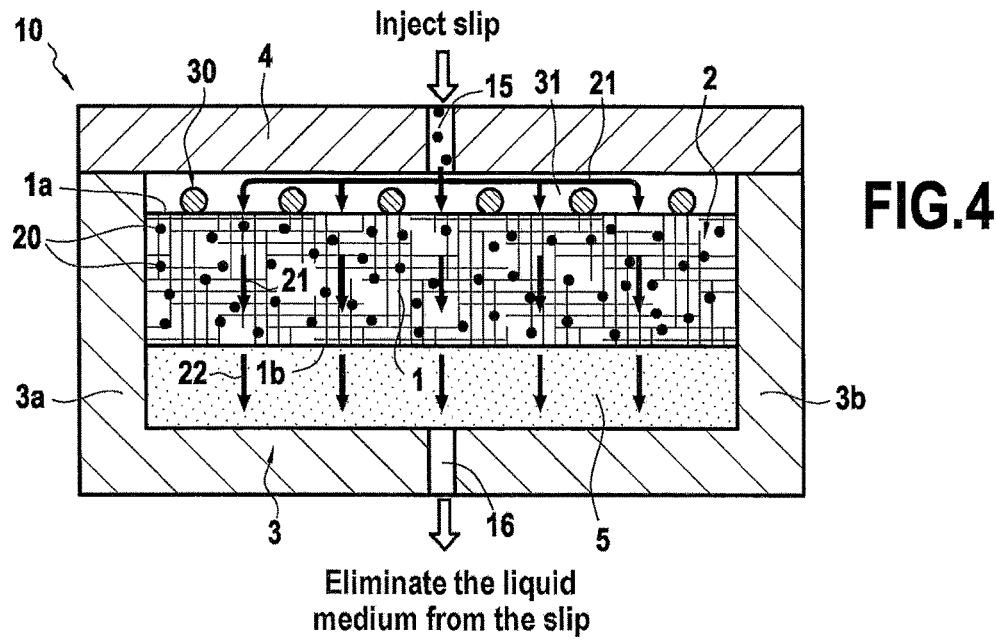
FIG. 4 is a diagrammatic and fragmentary view showing a configuration obtained while injecting and draining in a variant of the method of the invention.

FIG. 4 shows a variant implementation in which a distributor element 30, in this example in the form of a grid, is present between the first face 1a of the fiber texture 1 and the injection port 15 in order to distribute the flow of slip. This distributor element 30 is in contact with the first face 1a of the fiber texture 1. This distributor element 30 defines a plurality of openings 31 through which the slip flows during injection in order to reach the first face 1a of the fiber texture 1. The openings 31 may optionally be spaced apart regularly along the first face 1a of the fiber texture 1. As shown, the distributor element 30 may define at least two or indeed at least three openings 31.

Such an implementation serves advantageously to accelerate obtaining a uniform distribution of refractory particles in the fiber texture 1.

Naturally, it is possible to associate using such a distributor element with injecting the slip through a plurality of injection ports that open out into different zones of the mold cavity.

The other details relating to the above-described implementations of the method are applicable to this implementation. In particular, in a variant that is not shown, a deformable countermold 4' is used instead of the rigid countermold 4.

Figure 5:
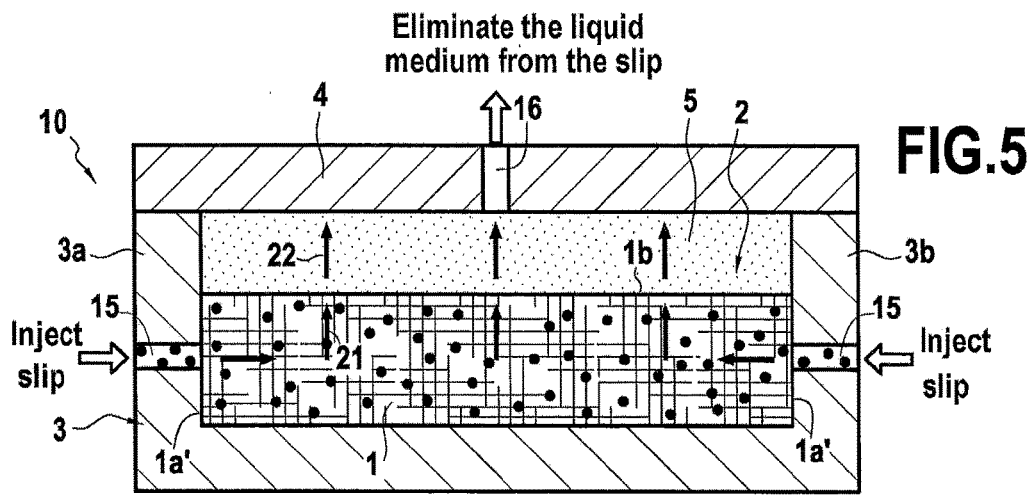
FIG. 5 is a diagrammatic and fragmentary view showing the configuration obtained while injecting and draining in a variant of the method of the invention.

FIG. 5 shows a variant implementation in which the mold 3 forming the support for the fiber texture 1 has side walls 3a and 3b through which the slip is injected. Injection takes place through the edges 1a' of the fiber texture 1. The slip is injected under pressure into the fiber texture 1. In the example shown in FIG. 5, the liquid medium is discharged through the top face 1b of the fiber texture.

Thus, in FIG. 5, injection and drainage do not take place via two opposite sides of the fiber texture. In this situation the slip is injected through an edge 1a' of the fiber texture, while the liquid medium is discharged through the top face 1b of the fiber texture 1.

The term "comprising/including a" should be understood as "comprising/including at least one".

The term "lying in the range . . . to . . . " should be understood as including the bounds.

The invention claimed is:

1. A method of fabricating a fiber preform filled with refractory ceramic particles, the method comprising the following steps:
   a) placing a fiber texture comprising refractory ceramic fibers in a mold cavity defined by a mold and a countermold;
   b) injecting a slip comprising a powder of refractory ceramic particles present in a liquid medium, the slip being injected into pores of the fiber texture present in the mold cavity, injection being performed through at least a first face of said fiber texture, wherein during step b), the slip is injected into the mold cavity through one or more injection ports, and prior to step b), the slip presents a volume content of refractory ceramic particles that is less than or equal to 40%; and
   c) draining the liquid medium of the slip that has penetrated into the fiber texture through a porous material part having thickness greater than or equal to 0.1 mm, the draining being performed at least through a second face of the fiber texture different from the first face, the first face and the second face both extending from edge to edge, and each edge extending along a thickness of the fiber texture, said porous material part also serving to retain the powder of refractory ceramic particles in the pores of the fiber texture in order to obtain a fiber preform filled with refractory particles, the porous material part being present between the mold and the fiber texture or between the countermold and the fiber texture, and the porous material part being present between at least one outlet vent and the fiber texture, pumping being performed at the outlet vent in order to drain the liquid medium through said outlet vent.

2. A method according to claim 1, wherein the mold constitutes a rigid support on which the fiber texture is present, and the countermold is rigid.

3. A method according to claim 1, wherein the mold constitutes a rigid support on which the fiber texture is present and the countermold is deformable.

4. A method according to claim 1, wherein the countermold exerts pressure on the fiber texture during and/or after step b).

5. A method according to claim 4, wherein the fiber texture is compacted between the mold and the countermold during and/or after step b).

6. A method according to claim 1, wherein during step b), the slip is injected through a plurality of different zones of an outside surface of the fiber texture.

7. A method according to claim 6, wherein a distributor element is present in the mold cavity to distribute the flow of slip, said distributor element defining a plurality of openings through which the slip flows during step b) in order to reach the first face of the fiber texture.

8. A method according to claim 1, wherein during step b), the slip is also injected through an edge of the fiber texture.

9. A method according to claim 1, wherein the slip includes an organic binder.

10. A method according to claim 1, wherein the fiber texture comprises refractory oxide fibers, and wherein the refractory particles are refractory oxide particles.

11. A method according to claim 1, wherein a pressure less than or equal to 950 mbar is applied to the outlet vent during step c).

12. A method according to claim 1, wherein the slip is injected under pressure during step b).

13. A method according to claim 12 wherein, during step b), the slip is injected at an injection pressure greater than or equal to 1.1 bar.

14. A method according to claim 1, wherein the fiber texture is made directly as a single piece by three-dimensional weaving.

15. A method according to claim 1, wherein at least one of the one or more injection ports is in front of the first face.

16. A method of fabricating a composite material part and including the following step:
sintering refractory ceramic particles present in a fiber preform, wherein the fiber preform is obtained by performing a process to form a refractory matrix in pores of said fiber preform, the process comprising
a) placing a fiber texture comprising refractory ceramic fibers in a mold cavity defined by a mold and a countermold;
b) injecting a slip comprising a powder of the refractory ceramic particles present in a liquid medium, the slip being injected into pores of the fiber texture present in the mold cavity, injection being performed through at least a first face of said fiber texture, wherein during step b), the slip is injected into the mold cavity through one or more injection ports, and prior to step b), the slip presents a volume content of refractory ceramic particles that is less than or equal to 40%; and
c) draining the liquid medium of the slip that has penetrated into the fiber texture through a porous material part having thickness greater than or equal to 0.1 mm, the draining being performed at least through a second face of the fiber texture different from the first face, the first face and the second face both extending from edge to edge, and each edge extending along a thickness of the fiber texture, said porous material part also serving to retain the powder of refractory ceramic particles in the pores of the fiber texture in order to obtain a fiber preform filled with refractory particles, the porous material part being present between the mold and the fiber texture or between the countermold and the fiber texture, and the porous material part being present between at least one outlet vent and the fiber texture, pumping being performed at the outlet vent in order to drain the liquid medium through said outlet vent.

* * * * *